Dec. 8, 1931.  J. A. ANANIA  1,835,132
FIRE APPARATUS
Filed April 22, 1929   8 Sheets-Sheet 1

Fig. 1.

Inventor
J. A. Anania.
By Lacey & Lacey, Attorneys

Dec. 8, 1931.  J. A. ANANIA  1,835,132
FIRE APPARATUS
Filed April 22, 1929    8 Sheets-Sheet 4

Inventor
J. A. Anania.
By Lacey & Lacey, Attorneys

Dec. 8, 1931.  J. A. ANANIA  1,835,132
FIRE APPARATUS
Filed April 22, 1929   8 Sheets-Sheet 7

Dec. 8, 1931.  J. A. ANANIA  1,835,132
FIRE APPARATUS
Filed April 22, 1929   8 Sheets-Sheet 8

Inventor
J. A. Anania
By Lacey & Lacey,
Attorneys

Patented Dec. 8, 1931

1,835,132

UNITED STATES PATENT OFFICE

JAMES A. ANANIA, OF HARRISON, NEW JERSEY, ASSIGNOR OF TEN PER CENT TO MAX ROSENTHAL, OF NEWARK, NEW JERSEY

FIRE APPARATUS

Application filed April 22, 1929. Serial No. 357,202.

This invention relates to apparatus for fighting fires and rescuing individuals from burning buildings.

The invention provides an extensible and angularly adjustable tower mounted upon a motor truck, a platform adjustable on the tower and adapted to be lengthened or shortened to establish communication with a burning structure, means carried by the tower to admit of one or more streams of water being effectively directed upon the fire or adjacent buildings from an elevation, counterbalancing means for the tower, and independent power transmissions utilizing the force of the motor for effecting the various adjustments of the motor actuated parts.

While the drawings illustrate a preferred embodiment of the invention, it is to be understood that in adapting the means to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which:—

Corresponding and like parts are referred to in the following description and designated in the several views of the drawings by like reference characters.

The numeral 1 denotes a base upon which a turntable 2 is mounted. These parts may be of any determinate and substantial construction to withstand the load and stresses of an apparatus of the character aforesaid. The base 1 is supported upon the chassis 3 of a motor truck. A drive shaft 4 is coupled to the shaft of the motor in any manner to be operated thereby and a plurality of gear wheels are mounted thereon in a manner to rotate therewith when clutched thereto. These gear wheels are designated by the numerals 5, 6, 7 and 8 and are loose upon the drive shaft 4 and are adapted to be clutched thereto by means of clutch elements 9 secured to the shaft 4. A lever 10 is associated with each of the gear wheels and is connected to an operating lever 11 mounted upon the truck within convenient reach of the driver's seat. In this manner any one of the various mechanisms may be connected to the motor to be operated thereby through the instrumentality of the shaft 4. A gear wheel 12 is secured to the under side of the turntable 2 and is in mesh with a pinion 13 fast to the upper end of a vertical shaft 14. Worm gearing 15 connects the lower end of the vertical shaft 14 with a horizontal shaft 16 upon which is mounted a long pinion 17 which is in mesh with the gear wheel 6. When the gear wheel 6 is clutched to the shaft 4 power is applied from the motor to rotate the turntable. Inner and outer shafts 18 and 19 pass loosely through the base 1 and turntable 2. Worm gearing 20 connects the lower end of the shaft 18 with a horizontal shaft 21 upon which is mounted a long pinion 22 which is in mesh with the gear wheel 7. When the gear wheel 7 is clutched to the shaft 4 power from the motor is applied to rotate the shaft 18 whereby to elevate the platform through instrumentalities which will be described more fully hereinafter. A transverse shaft 23 is geared to the shaft 18 at one end and at its opposite end to a longitudinal shaft 24.

Figures 5, 6, 7, 8:
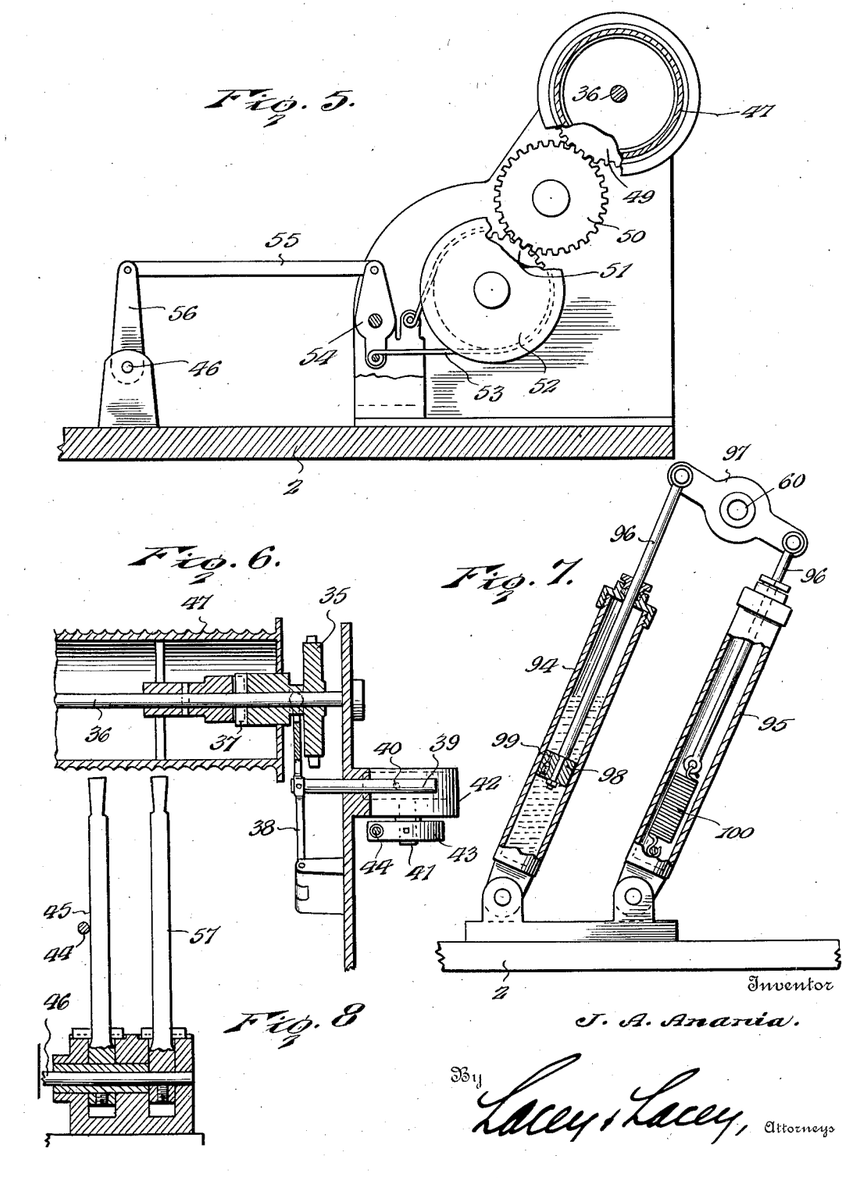
Figure 5 is a detail sectional view on the line 5—5 of Figure 2, looking in the direction designated by the arrows.
Figure 6 is a fragmentary sectional view on the line 6—6 of Figure 2, looking in the direction designated by the arrows.
Figure 7 is a detail sectional view of the tower counterbalancing means on the line 7—7 of Figure 2, looking in the direction indicated by the arrows.
Figure 8 is a detail sectional view on the line 8—8 of Figure 2, showing the levers as they appear looking in the direction designated by the arrows.
Figure 9:
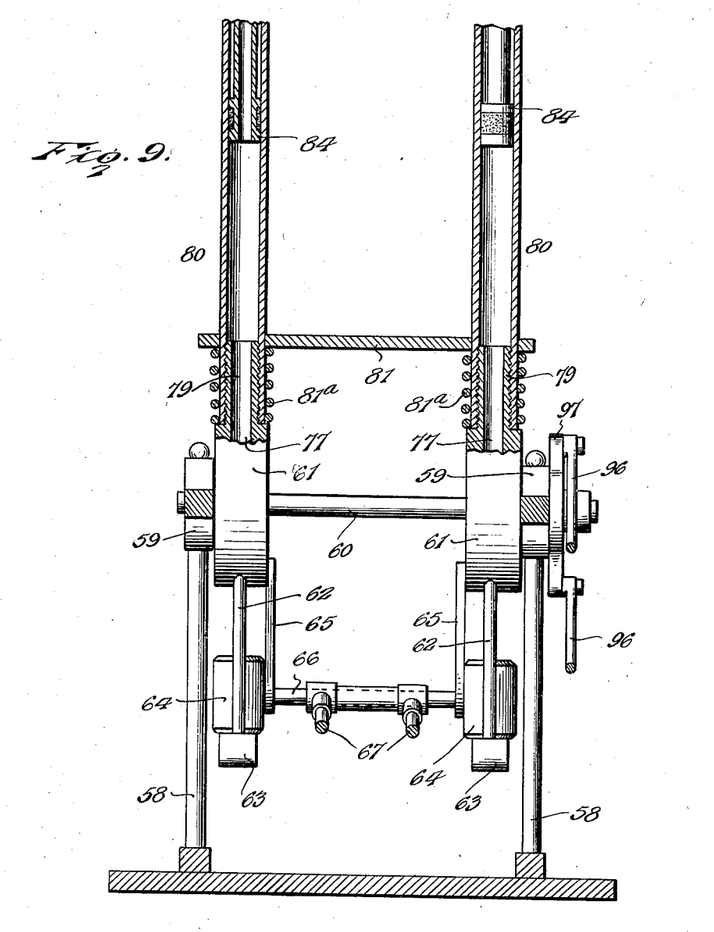
Figure 9 is a fragmentary sectional view on the line 9—9 of Figure 3, when viewed in the direction indicated by the arrows.
Figure 10:
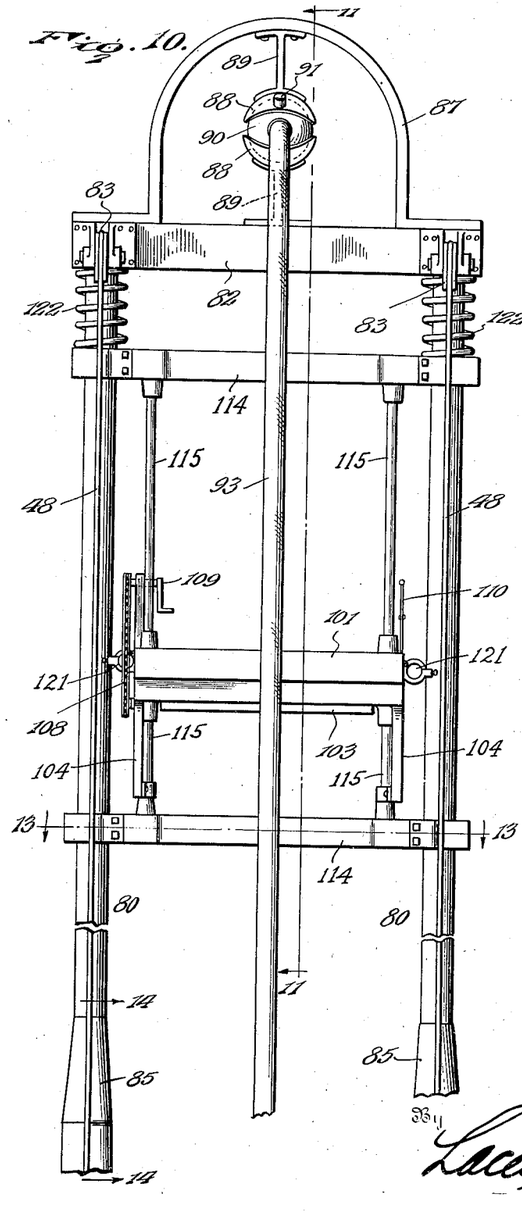
Figure 10 is a front view of the upper portion of the tower and associated parts on an enlarged scale.

Bevel gearing 25 connects the shafts 18 and 23. Bevel gearing 26 connects the shafts 23 and 24. Worm gearing 27 connects the longitudinal shaft 24 with a transverse shaft 28, and the latter shaft is geared to a cog wheel 29 loose upon a stub shaft 30 upon which is mounted a ratchet wheel 31. A sprocket gear 32 loose upon the stub shaft 30, has the ratchet wheel 31 fast thereto and said ratchet is adapted to coact with pawls 33, pivoted on the side of the cog wheel 29, whereby rotation of the wheel 29 in a clockwise direction effects a corresponding rotation of the sprocket gear 32. The stub shaft 30 is fixed, whereas the spur gear 29 and sprocket gear 32 are loose thereon, the ratchet wheel 31 being secured to the sprocket gear 32 to rotate therewith and acts jointly with the pawls 33 pivoted to the spur gear 29 in the manner stated. A sprocket chain 34 connects the sprocket wheel 32 with a companion sprocket gear 35 loose upon a shaft 36 disposed transversely of the turntable 2. A clutch 37 has one element fast to the shaft 36 and the companion element connected to the sprocket gear 35 and as a result movement of the sprocket gear 35 along the shaft 36 throws it into or out of clutched engagement. A lever 38 pivoted at one end to an upright is in engagement with the sprocket gear 35. A rod 39 projects laterally from the lever 38 and engages a pin 40 projecting from the head of a stud 41 mounted in a bearing 42 projecting laterally from the upright to which the lever 38 is pivoted. A collar 43 secured to the lower end of the stud 41 is formed with an offstanding portion to which one end of a rod 44 is connected, the opposite end of said rod being connected to a lever 45 which is mounted to rock upon a transverse shaft 46 as shown most clearly in Figure 8 of the drawings.

A drum 47 is mounted upon the shaft 36 and fast thereto for rotation therewith. Cables 48 are adapted to be wound upon the drum 47 for elevating the platform.

A gear wheel 49 is fast to one end of the drum 47 and is in mesh with an idle gear 50 which in turn is in mesh with a gear wheel 51 fast to a brake drum 52 with which is associated a brake band 53. One end of the brake band 53 is fixed and its opposite end is connected to one end of a lever 54 the opposite end of which is connected by means of a rod 55 to an arm 56 projecting from the shaft 46. This provides a brake mechanism for controlling the unwinding of the cables 48 from the drum 47 when the platform is descending and the drum 47 is disconnected from the sprocket wheel 35 of the operating mechanism. A lever 57 on the shaft 46 is fast thereto and for convenience is disposed adjacent the loose lever 45. The descent of the platform may be controlled by manipulation of the levers 45 and 57, as will be readily comprehended.

Figure 3:
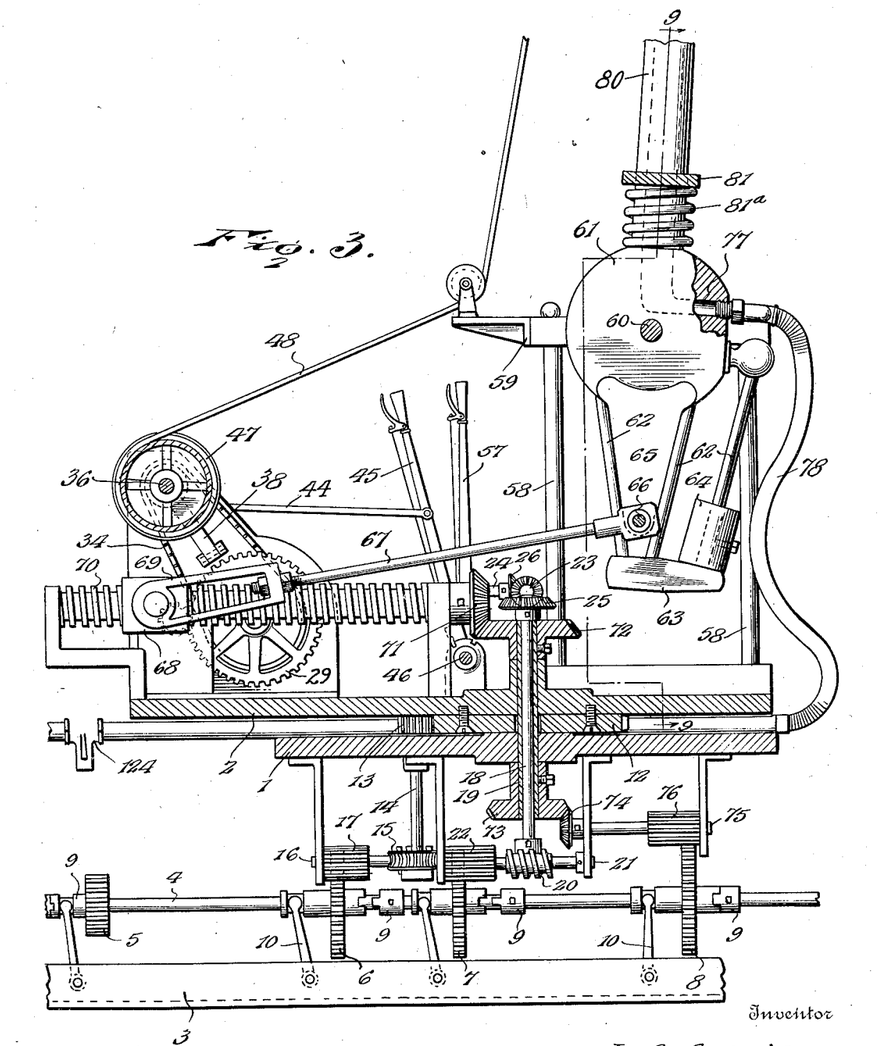
Figure 3 is an enlarged view of the base portion of the apparatus partly in section showing more clearly the power transmitting means for operating the parts adapted to be motor driven.

Posts 58 rise from the end of the turntable 2 opposite that provided with the drum 47 and adjunctive parts. Cross pieces 59 connect the upper ends of the posts 58 at the respective sides of the turntable. A shaft 60 is mounted in the cross pieces 59 and forms a support for the tower. Hubs 61 are fast to opposite end portions of the shaft 60 and receive the tower. A plurality of rods 62 project downwardly from each of the hubs 61 and are connected at their lower ends by weights 63 which serve as counterbalancing means for the tower. Other weights 64 are adjustable upon the outer most rods 62, as indicated most clearly in Figure 3 of the drawings. Other arms 65 depend from the hubs 61 and are connected at their lower ends by means of a cross piece 66 to which links 67 are connected. A nut 68 is connected by turnbuckles 69 to the respective links 67. An adjusting screw 70 longitudinally mounted upon the turntable 2 receives the nut 68 and when rotated moves the said nut to adjust the tower towards or away from a vertical plane. A gear wheel 71 fast to the inner end of the screw 70 is in mesh with a gear wheel 72 secured to the upper end of the shaft 19. A gear wheel 73 fast to the lower end of the shaft 19 is in mesh with a gear wheel 74 fast to an end of a shaft 75, to which is secured a long pinion 76 which is in mesh with the gear wheel 8. In this manner motion is transmitted from the shaft 4 to the screw 70 when setting the tower. A passage 77 is formed in each of the hubs 61 and a hose pipe 78 is adapted to be connected to each of said passages. A nipple 79 projects from each of the hubs 61 in line with an end of the passage 77 and provides convenient and substantial means for connecting the tower to the hubs.

As previously stated the tower is extensible and comprises sections having a telescopic connection. The tower includes two similar or like columns 80 each comprising a plurality of sections slidable one within the other and having a piston fit to prevent any loss of pressure. The lower ends of the columns 80 engage over the nipples 79 to which they are secured in any substantial and determinate way. A yoke 81 connects the lower ends of the columns 80 and is yieldably supported upon springs 81ª which function to cushion the impact of the platform when reaching the limit of its descent upon the tower. A cross piece 82 connects the upper ends of the columns 80 and carries guide pulleys 83 over which the cables 48 pass. The sections comprising each of the columns 80 are tubular and the lower end of each of the movable sections is formed with a piston head 84 to obtain a snug fit within the section in which it is free to move.

Figure 14:
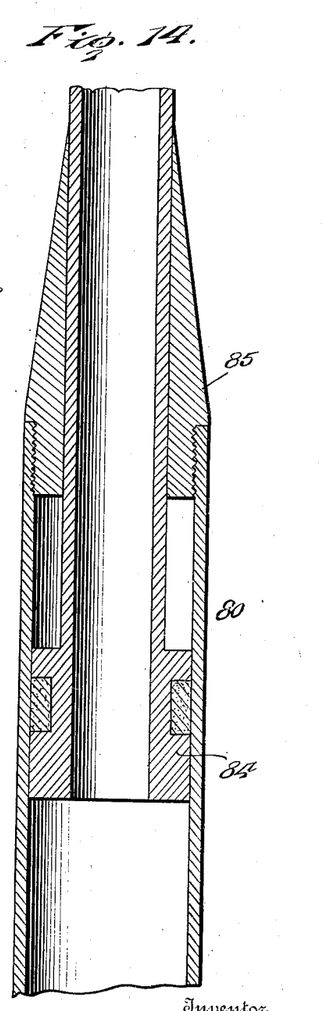
Figure 14 is an enlarged sectional view of the joint formed between telescoping elements of the tower on the line 14—14 of Figure 10.

A cap 85 is fitted to the upper end of each of the sections comprising the columns 80 with the exception of the top section. The lower end of the cap 85 provides a stop which in conjunction with the piston head 84 of the section sliding therethrough constitutes stop means to limit the extension of the sections. This will be obvious on reference to Figure 14 of the drawings. The upper end of the cap 85 is tapered to provide for the ready passage of the platform support thereover. A truss brace 86 reinforces and strengthens the bottom section of each of the columns 80.

Figures 11, 15:
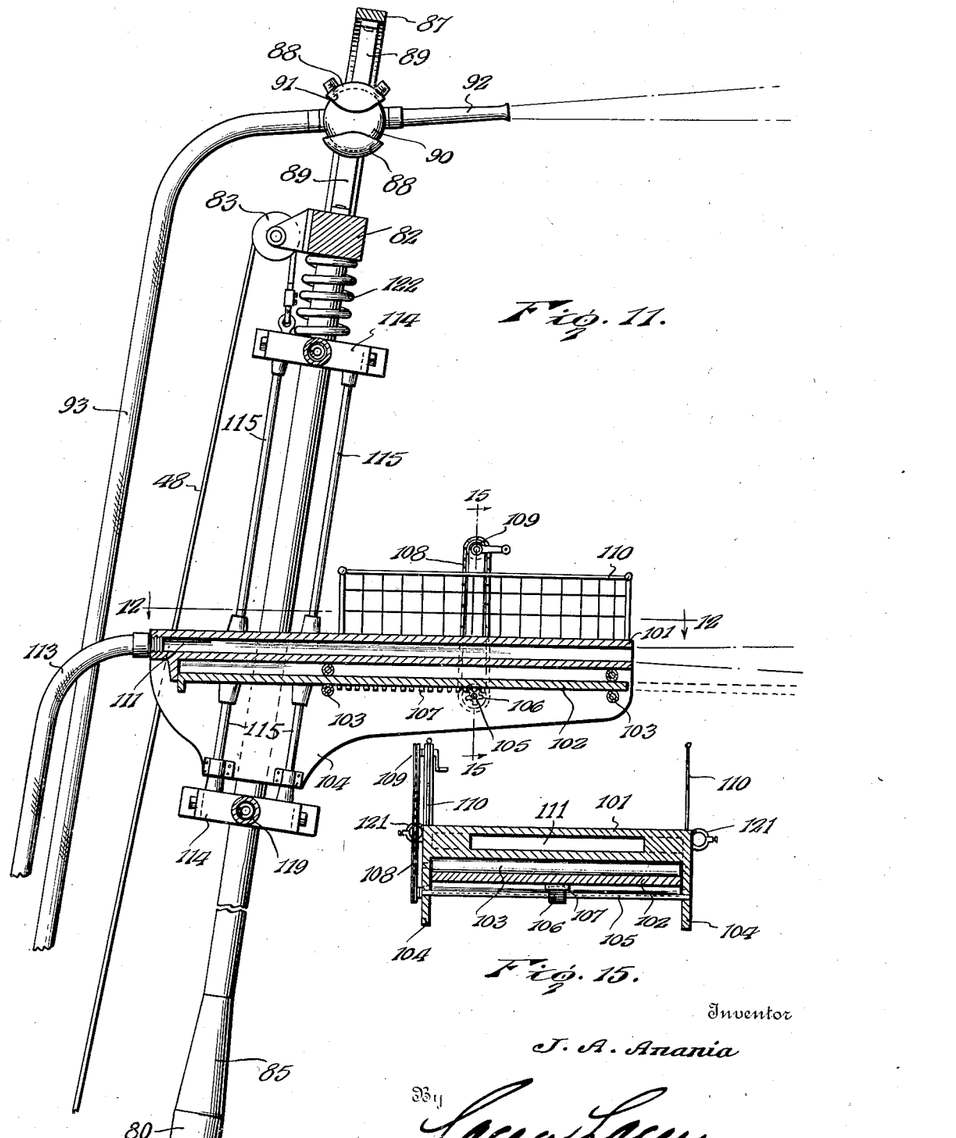
Figure 11 is a detail sectional view on the line 11—11 of Figure 10, looking to the left as indicated by the arrows.
Figure 15 is a vertical, transverse sectional view of the platform on the line 15—15 of Figure 11.

An arch 87 is mounted upon the cross piece 82 and a clamp is held between the arch 87 and said cross piece, the clamp comprising complemental jaws 88 which are connected to the respective parts 82 and 87 by arms 89. A ball 90 is held between the jaws 88 and is retained in the required adjusted position by means of friction grips 91 applied to one of the jaws 88, as indicated most clearly in Figure 11 of the drawings. The nozzle 92 of a fire hose 93 is supported in the ball 90. The universal joint thus provided admits of the nozzle 92 being adjusted to direct a stream of water in any required direction. The grips may be of the same construction as shoes which engage the columns 80 and which will be presently described, but any device which will hold the ball in a set position but yield to force exerted upon the ball may be employed.

For controlling the movement of the tower when adjusting the inclination of the same two cylinders 94 95 are provided. These cylinders are pivoted at their lower ends to the turntable 2 and each has a rod 96 operable therein and connected to the arms of a cross piece 97 fast to an end of the transverse shaft 60. A plunger 98 secured to the lower end of one of the rods 96 is operable in the cylinder 94 and obtains a loose sliding fit therein and is provided with a valve controlled passage 99. A heavy and strong contractile spring 100 is disposed within the cylinder 95 and connects the lower end thereof to the lower end of the rod 96 operating therein. The cylinder 94 contains a suitable fluid which retards the movement of the plunger 98 therein. As the tower is adjusted the shaft 60 to which it is attached is rocked and imparts a corresponding movement to the cross piece 97 which, being connected to the plunger 98 and spring 100, is prevented from moving too rapidly with the result that the movements of the tower are automatically controlled. The piston 98 has a well-known action. Downward movement is resisted by the liquid in the cylinder inasmuch as the liquid can then pass only through the very restricted space or clearance between the piston and the wall of the cylinder while the upward movement of the piston may be more rapid inasmuch as the check valve, which may be of any approved type, will then be opened.

The platform is denoted by the numeral 101 and is mounted upon the tower in a manner to be adjusted thereon. The platform is extensible and includes a section 102 which is disposed therebelow and mounted in a manner to be moved outward and inward, and for convenience is shown disposed between pairs of rollers 103 mounted in cheek pieces 104 depending from the sides of the platform 101. The section 102 is slidable between the cheek pieces 104 and the rollers comprising the pairs of rollers 103.

A shaft 105 is journaled in the cheek pieces 104 and provided intermediate its ends with a pinion 106 in mesh with cog teeth 107 provided upon the under side of the section 102. A sprocket chain 108 connects a sprocket wheel at one end of the shaft 105 with a corresponding sprocket wheel at one end of a crank shaft 109 mounted in an upright of the platform 101.

Figure 12:
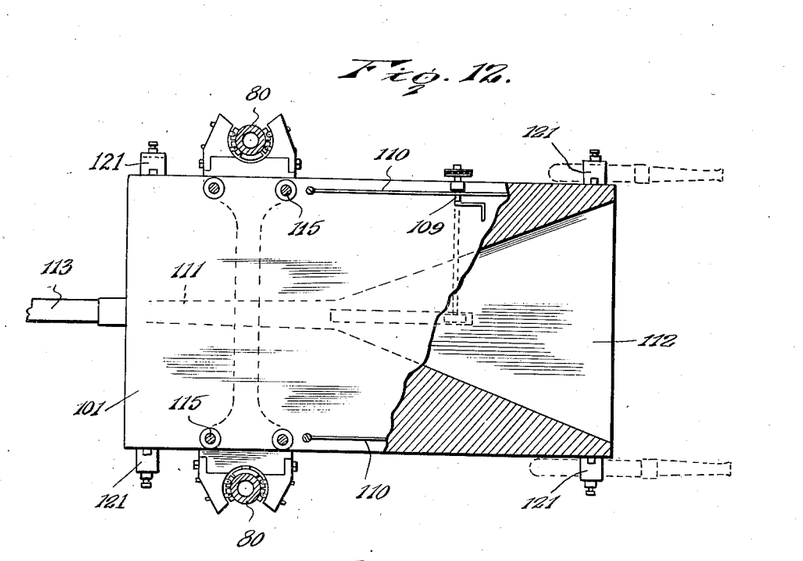
Figure 12 is a horizontal sectional view on the line 12—12 of Figure 11, partly broken away.

A person upon the platform 101 may adjust the section 102 by proper manipulation of the crank shaft 109, as will be readily understood. A fence 110 is provided at each side of the platform 101 for safety. A passage 111 is formed in the platform 101 and flares at one end, as indicated at 112 in Figure 12, to deliver a sheet of water. A fire hose 113 is adapted to be connected to the passage 111.

Figures 13, 16, 17:
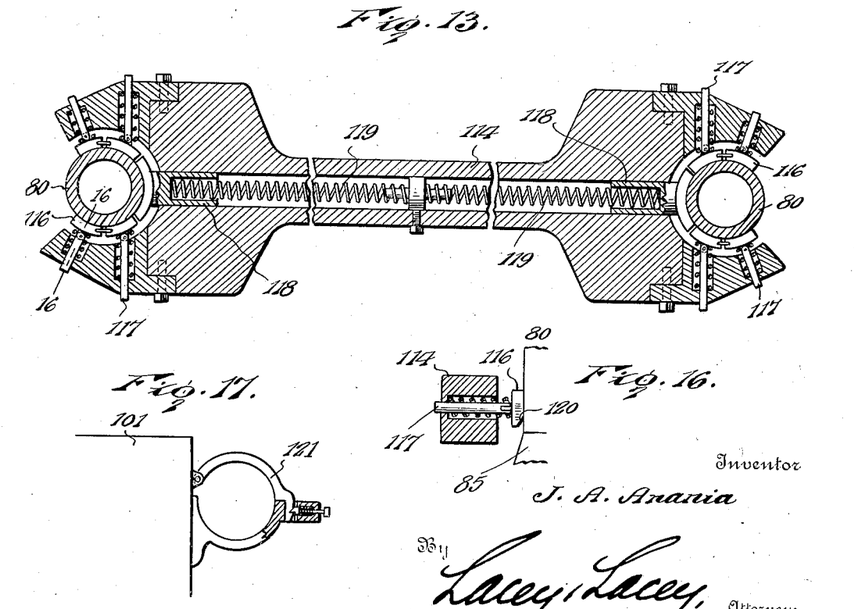
Figure 13 is an enlarged detail sectional view on the line 13—13 of Figure 10.
Figure 16 is a fragmentary sectional view on the line 16—16 of Figure 13.
Figure 17 is an enlarged view of one of the clamps for connecting a fire hose to the platform.

The carriage or supporting frame for the platform comprises similar or like upper and lower members 114 and rods 115 connecting said members with the platform. The ends of the cross members 114 are enlarged and recessed to accommodate the columns 80. A plurality of shoes 116 are grouped about the columns 80 and are yieldably connected to the ends of the cross members 114. An expansible helical spring coacts with each of the shoes 116 to hold it in engagement with the column 80. A stem 117 is pivotally connected to each of the side shoes 116 and a hollow stem 118 projects from each of the inner shoes and receives the outer end of an open helical spring 119 disposed in an opening extending through the member 114. The inner wall portion of each of the shoes 116 is beveled, as indicated most clearly at 120 in Figure 16, to engage and ride upon the beveled end 85 of the sections comprising the respective columns 80 when the platform is descending. The springs associated with the respective shoes 116 yieldably hold them in engagement with the columns 80 and provide for variations incident to passing from one section to another as the platform is raised or lowered upon the tower. The cables 48 are connected to the upper cross member 114 and when wound upon the drum 47 effect a lifting of the platform and when unwound from said drum admit of the platform lowering. Hose clamps 121 mounted upon the platform 101 provide for holding additional lines of fire hose. Open springs 122 around the upper ends of the columns 80 between the cross bar 82 and the upper member 114 function as bumpers to relieve impact when the platform 101 reaches the limit of its upward movement upon the tower. The springs may be loose or may be fastened to either member 82 or 114 as preferred.

Figure 1:
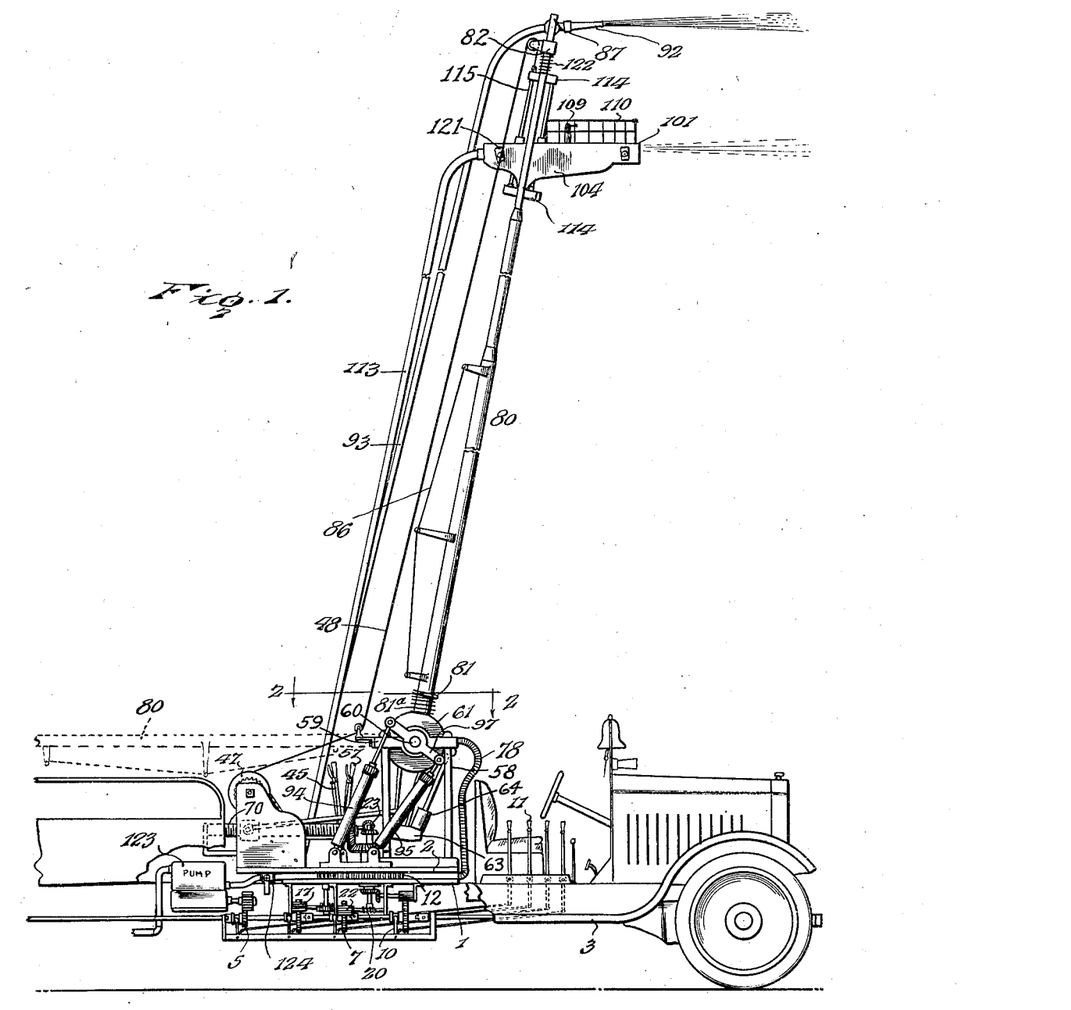
Figure 1 is a side view of a fire apparatus embodying the invention.
Figures 2, 4, 18:
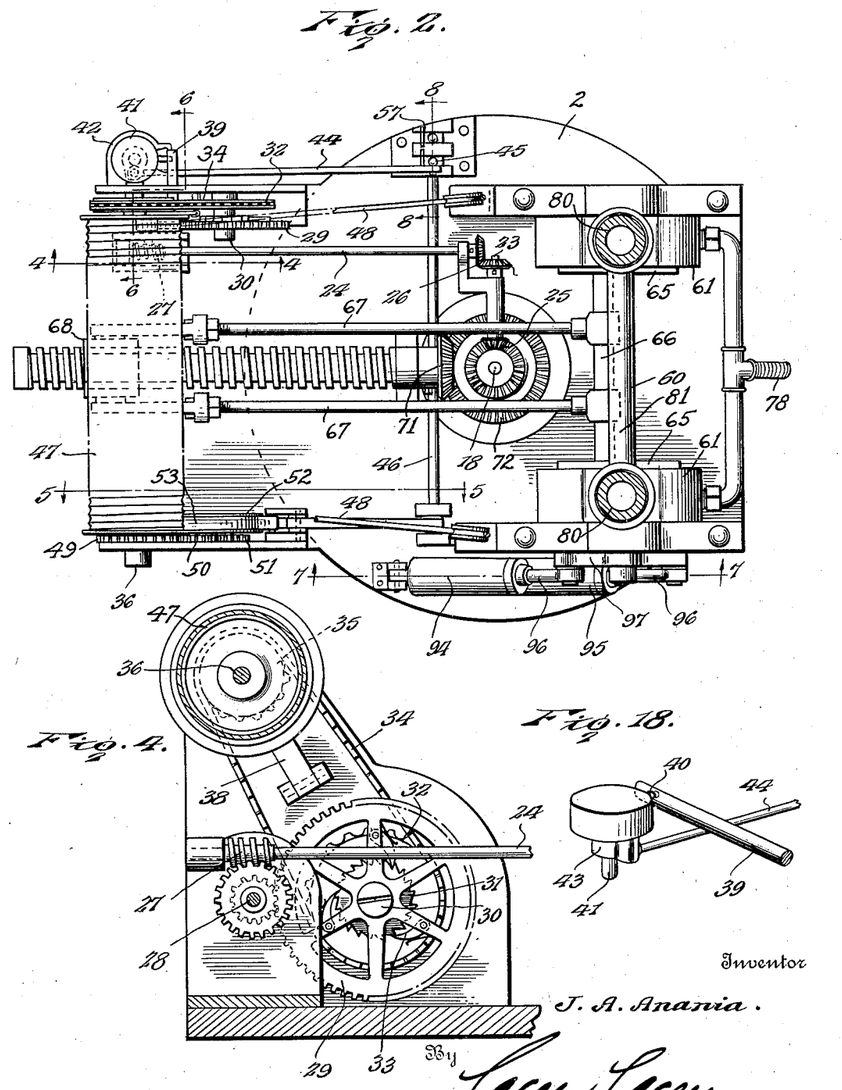
Figure 2 is an enlarged horizontal sectional view of the apparatus removed from the truck on the line 2—2 of Figure 1.
Figure 4 is a detail sectional view on the line 4—4 of Figure 2, looking in the direction of the arrows.
Figure 18 is a fragmentary perspective view of part of the means for throwing the drum out of clutched engagement with the power operating means.

The apparatus is mounted upon a truck adapted to be propelled by a suitable motor which is also utilized for operating the several parts capable of being actuated by motor power in a manner herein indicated. The topmost sections of the columns 80 of the tower are closed and the construction is such as to admit of the platform being lowered to the foot of the tower so as to rest upon the cross piece 81. When the tower is collapsed the several sections are at the limit of their downward movement and the construction is such as to admit of the tower being turned to occupy an approximate horizontal position, as indicated by the dotted lines in Fig. 1. A pump 123 mounted upon the truck has the hose 78 connected thereto and is adapted to draw water from a suitable source which when forced into the columns of the tower extends the same to the desired point within the range of its adjustment. A two-way valve 124 in the length of the pipe line 78 provides for relieving the columns 80 of pressure when it is required to collapse the tower. Any suitable fluid may be utilized for extending the tower and may be supplied to the columns thereof under pressure in any determinate way. After the tower has been erected and extended it may be turned by rotating the turntable 2 and may be tilted by rotating the screw 70. The platform may be elevated to the required height by winding the cables 48 upon the drum 47. Should it be necessary to lengthen the platform this may be accomplished by rotating the crank shaft 109. A plurality of streams of water may be directed upon a burning structure from an elevated point and these streams may be controlled from the platform and the latter may be utilized as means for effecting a rescue of persons from the burning building. By manipulating the levers 45 and 57 the platform may be raised or lowered. When the lever 45 is operated the drum 47 is disconnected from the power actuating means and the platform descends by gravity which is controlled by means of the lever 57 through the brakes 52—53 associated with the drum. The several parts may be independently controlled through the levers 11 and the clutches associated with the shaft 4 and the several gear wheels 5, 6, 7 and 8.

Having thus described the invention, I claim:—

1. Fire apparatus comprising a motor truck, a drive shaft adapted to be driven from the motor of the truck, gear wheels mounted upon the drive shaft, a clutch between each of the gear wheels and drive shaft, a turntable, a tower pivoted upon the turntable, a slidable platform on the tower, means whereby the platform may be adjusted along the tower, and power translating connections between the several gear wheels and the turntable, tower and platform to admit of each being independently operated from the said drive shaft.

2. In fire apparatus the combination of a base, a turntable thereon, inner and outer shafts extending through the base and turntable, concentric with its axis, a tower pivotally mounted upon the turntable, operating means for the tower connected with one of said shafts, a platform on the tower, a drum mounted upon the turntable and connected with the other one of said shafts to be operated thereby, and connections between the drum and the platform.

3. In apparatus of the character specified, the combination of a support, a tower pivoted thereon, means for pivotally adjusting the tower, a plurality of rods projecting from the pivotal end of the tower in an opposite direction thereto, a counterweight connecting the remote ends of the rods, and a weight on one of said rods and adjustable toward and away from the pivot of the tower.

4. In apparatus of the character specified, the combination of a support, a tower pivoted thereon, means for pivotally adjusting the tower, and means for controlling the pivotal movement of the tower and comprising a pair of cylinders, a plunger in one of the cylinders, and a spring in the other cylinder, and rods forming connecting means between the tower and the said plunger and spring.

5. In apparatus of the character specified, the combination of a tower, a platform slidable along the tower, means whereby the platform may be adjusted along the tower, shoes associated with the platform, and means maintaining positive frictional engagement between the shoes and the sides of the tower to prevent a too rapid descent of the platform.

6. In apparatus of the character specified, the combination of a tower comprising telescopic sections having an exterior tapered joint between the respective sections, a platform slidable along the tower, shoes associated with the platform and frictionally engaging the outer side of the sections of the tower, and means for shifting the platform along the tower.

7. In apparatus of the character specified, the combination of a tower comprising spaced columns each including telescopic sections having an exterior tapered joint between the sections, a platform slidable along the columns comprising the tower, a cross member on the platform connecting the columns and slidable thereon, means for shifting the platform along the tower, and spring actuated shoes mounted upon the cross member and frictionally engaging the columns of the tower.

8. In fire apparatus, a transverse shaft, hubs secured thereto and formed with passages and having nipples in communication with the passages, a tower comprising columns connected to the nipples of the hubs and comprising telescopic sections, means for supplying fluid pressure to the hubs for extending the tower, pistons at the lower ends of the several sections of the columns, caps closing the upper ends of the sections and acting jointly with the pistons to limit the extension of the sections, counterbalancing and movement controlling means associated with the tower, a platform, upper and lower cross members slidably engaging the said columns and connected with the platform, and shoes yieldably connected with said cross members and frictionally engaging the columns of the tower.

In testimony whereof I affix my signature.

JAMES A. ANANIA. [L. S.]